(12) United States Patent
Zheng et al.

(10) Patent No.: US 9,317,766 B2
(45) Date of Patent: Apr. 19, 2016

(54) METHOD AND DEVICE FOR EXTRACTING DISTORTED STRAIGHT LINE FROM IMAGE

(71) Applicant: FUJITSU LIMITED, Kawasaki-shi, Kanagawa (JP)

(72) Inventors: Yun Zheng, Beijing (CN); Shufu Xie, Beijing (CN); Pan Pan, Beijing (CN); Yuan He, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/563,335

(22) Filed: Dec. 8, 2014

(65) Prior Publication Data
US 2015/0161473 A1 Jun. 11, 2015

(30) Foreign Application Priority Data

Dec. 9, 2013 (CN) .......................... 2013 1 0659933

(51) Int. Cl.
| | |
|---|---|
| G06K 9/20 | (2006.01) |
| G06K 9/32 | (2006.01) |
| G06K 9/46 | (2006.01) |
| G06T 7/00 | (2006.01) |
| G06T 3/00 | (2006.01) |
| G06K 9/36 | (2006.01) |

(52) U.S. Cl.
CPC ............ *G06K 9/3275* (2013.01); *G06K 9/4638* (2013.01); *G06T 3/0031* (2013.01); *G06T 7/0085* (2013.01); *G06K 2009/363* (2013.01); *G06T 2207/20136* (2013.01)

(58) Field of Classification Search
None
See application file for complete search history.

(56) References Cited

PUBLICATIONS

Leandro A.F. Fernandes, Real-time line detection through an improved Hough transform voting scheme, Elsevier 2008.*
J. Matas, Robust Detection of Lines Using the Progressive Probabilistic Hough Transform, Computer Vision and Image Understanding, 2000.*
J. Illlingworth et al, A Survey of the Hough Transform, Computer Vision, Graphics and Image Procesing 1988.*

* cited by examiner

*Primary Examiner* — Mark Roz
(74) *Attorney, Agent, or Firm* — Staas & Halsey LLP (57) ABSTRACT

A method and a device for extracting a distorted straight line from an image. The method includes performing a line segment detection process on the image; for each line segment detected, finding adjacent line segments having a low non-collinear degree with a current line segment, so as to combine them together to obtain one or more line segment combinations; and extracting the distorted straight line according to the line segment combination.

10 Claims, 6 Drawing Sheets

METHOD AND DEVICE FOR EXTRACTING DISTORTED STRAIGHT LINE FROM IMAGE

CROSS-REFERENCE TO RELATED APPLICATION(S)

This application claims the foreign priority benefit of Chinese Application No. 201310659933.7, filed Dec. 9, 2013, the disclosure of which is incorporated herein by reference.

BACKGROUND

1. Field

Embodiments of the present invention relate to a method and a device for extracting a distorted straight line from an image.

2. Description of Related Art

A text image obtained by a scanner and a digital camera generally has larger distortions. To correct these distortions, firstly, distorted straight lines should be extracted from the text image. Then the whole text image is corrected by correcting these distorted straight lines.

Figure 1:
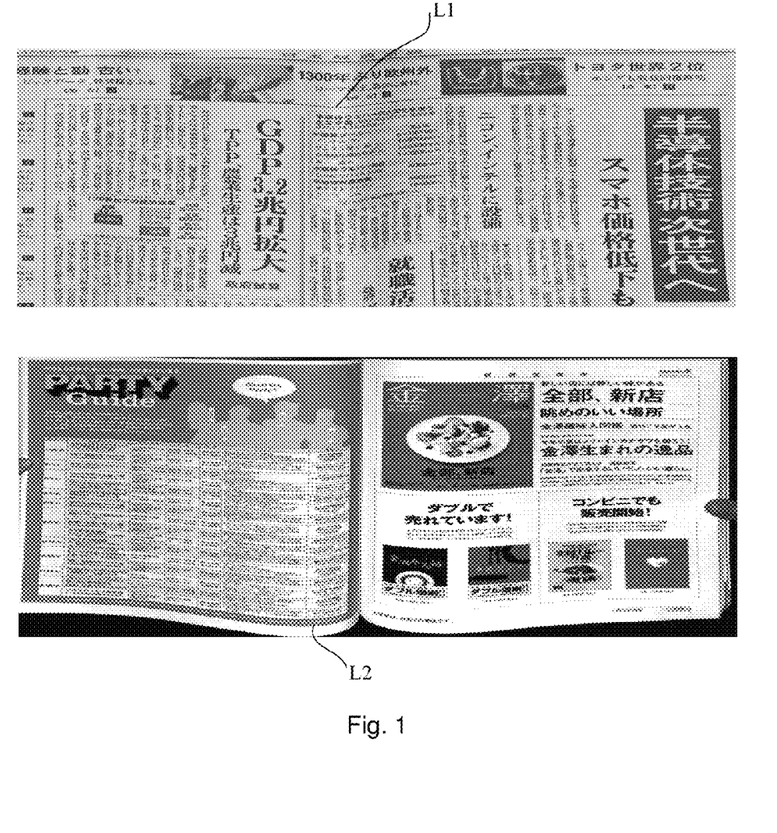
FIG. 1 is a schematic view illustratively showing a distorted straight line in a text image.

The distorted straight line in the text image is as shown in FIG. 1. In a file-type text image as shown in the upper portion of FIG. 1 and a book-type text image as shown in the lower portion of FIG. 1, a line, which is a horizontal straight line in a file or a book originally, becomes distorted straight lines L1 and L2.

An existing method for extracting the distorted straight line from the text image includes Hough conversion and RANSAC algorithm. However, the existing extracting method generally relays on a specific parameter form of the distorted curved line and cannot be adapted to extract the curved line of arbitrary shape, and thus the accuracy is reduced.

The embodiments are provided for overcoming the drawbacks in the conventional art.

SUMMARY

Hereinafter, brief descriptions of the embodiments will be made, so as to provide a basic understanding to some aspects. It should be understood that the brief descriptions are not exhaustive brief descriptions. They are neither intended to determine the key or essential parts nor intended to limit the scope, but only aim to provide some concepts in a simplified form, for use as a preamble of more detailed descriptions addressed later.

A main object is to provide a method for extracting a distorted straight line from an image, so as to overcome the problem that the existing extracting method relays on a specific parameter form of the distorted curved line and cannot be adapted to extract the curved line of arbitrary shape.

According to an aspect of the embodiments, provided is a method for extracting a distorted straight line from an image, comprising: performing a line segment detection process on the image; for each line segment detected, finding adjacent line segments having a low non-collinear degree with a current line segment, so as to combine them together to obtain one or more line segment combinations; and extracting the distorted straight line according to the line segment combination.

In the above method for extracting the distorted straight line from the image, before the extracting, the following step may be further included: a refinement process for optimizing size of a gradient and smoothness is performed on the line segment combination.

In the above method for extracting the distorted straight line from the image, the refinement process may be performed by constructing and solving a balanced energy function for optimizing both of size of the gradient and smoothness.

In the above method for extracting the distorted straight line from the image, the refinement process may be performed when a discontinuity larger than a predetermined number of pixels is present in the line segment combination.

According to an aspect of the embodiments, provided is a device for extracting a distorted straight line from an image, comprising: a detecting module configured to perform a line segment detection process on the image; a combining module configured to, for each line segment detected, find adjacent line segments having a low non-collinear degree with a current line segment, so as to combine them together to obtain one or more line segment combinations; and an extracting module configured to extract the distorted straight line according to the line segment combination.

In addition, the embodiments further provide a computer program for carrying out the above method.

The embodiments further provide a computer program product in the form of at least a computer-readable medium, on which computer program codes for carrying out the above method are recorded.

The method and device according to the embodiments do not relay on the specific parameter form of the distorted curved line and can be adapted to extract the curved line of arbitrary shape, and thus the accuracy for extracting the distorted straight line is improved.

In addition, the method and device according to the embodiment have faster processing speed.

These and other advantages of the embodiments will become more apparent from the following detailed descriptions of the embodiments combined with the accompanying drawings.

BRIEF DESCRIPTION OF DRAWINGS

Hereinafter, embodiments will be described combined with the attached drawings in order to facilitate the understanding to the above and other advantages and features of the present invention. The components in the attached drawings aim only to illustrate the principle of the present invention. In the attached Drawings, identical or similar technical features or components will be denoted by identical or similar reference signs.

DETAILED DESCRIPTION

Hereinafter, the embodiments will be described with reference to the attached drawings. Elements and features described in one figure or one embodiment may be combined with elements and features illustrated in one or more other figures or embodiments. It should be noted that, for the purpose of clarity, representations and descriptions of components and processing irrelevant to the present invention which are known to those ordinarily skilled in the art are omitted in the attached drawings and descriptions thereof.

Figure 2:
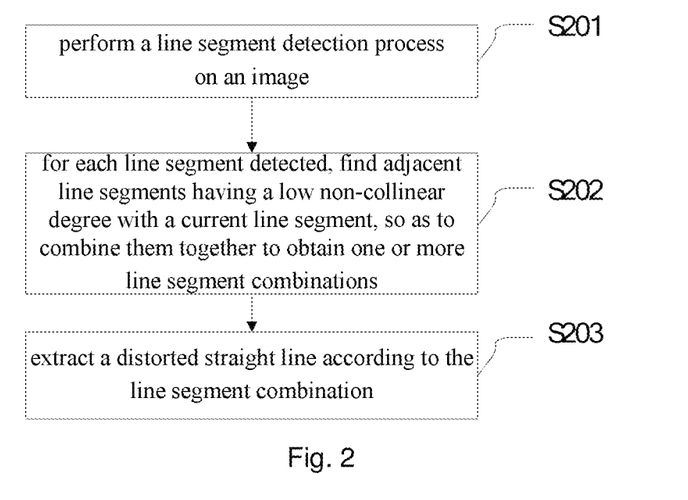
FIG. 2 is a flowchart illustratively showing a method for extracting a distorted straight line from an image according to an embodiment.

FIG. 2 is a flowchart illustratively showing a method for extracting a distorted straight line from an image according to the embodiments. In the following, a method for extracting a distorted straight line from an image will be described referring to FIG. 2.

In step S201, a line segment detection process is performed on the image.

Before the line segment detection process is performed on the image, a preprocess may be performed on an original image. The preprocess may be one or more of: zooming out the original image proportionally, where for example, the original image is down-sampled, so that a width and length of the image after sampling are respectively ¼ of a width and a length of the original image; converting the original image into a gray image if the original image is a color image; and smoothing the original image, such as Gaussian smoothing. It is known to those skilled in the art that the preprocess for the image may be selected arbitrarily.

Then, the line segment detection process is performed on the preprocessed image. For example, LSD algorithm, which is proposed by Gioi et. al, may be run on the preprocessed image. The basic idea of the LSD algorithm is to cluster pixels with similar gradient directions and magnitudes to detect the straight line segments. However, line segment detection algorithms such as LSD algorithm can detect only some discontinuous line segments, and thus respective integral distorted straight lines in the image should be further combined to obtain these line segments.

In step S202, for each line segment detected, adjacent line segments having a low non-collinear degree with a current line segment are found, so as to combine them together to obtain one or more line segment combinations. The low non-collinear degree described above represents a probability that any two line segments can be connected to be a straight line. The lower the non-collinear degree between two line segments is, the higher the probability that the two line segments can be connected to be a straight line.

Before step S202, the detected line segments with shorter length may be filtered out to remove noise. For example, the line segments with length less than 6 pixels are filtered out firstly. Further, if a distorted horizontal straight line is to be extracted from the image, the line segments with greater length-width ratio may be filtered out, such as line segments with y/x>1.5, where y denotes the length of the line segment in a vertical y-axis direction, and x denotes the length of the line segment in a horizontal x-axis direction. Practically, if a distorted vertical straight line is to be extracted from the image, the line segments with less length-width ratio may be filtered out.

Figure 3:
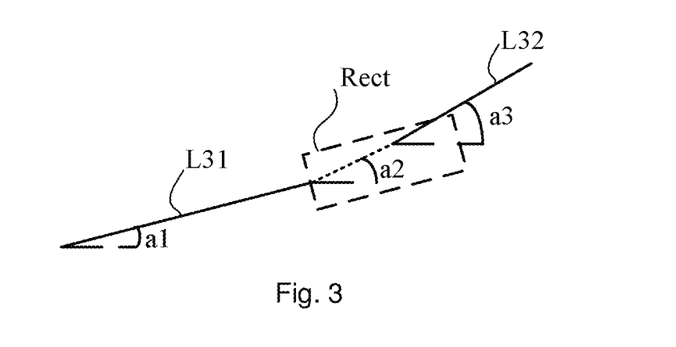
FIG. 3 is a schematic view illustratively showing a way for searching adjacent line segments of a current line segment according to an embodiment.

For each of the line segments that are not filtered out, adjacent line segments having a low non-collinear degree with a current line segment are found. Specifically, an adjoining rectangular area may be defined along a slope direction of the current line segment; and another line segment whose non-collinear degree with a current line segment is lower than a predetermined threshold is searched as the adjacent line segment within the adjoining rectangular area in accordance with a principle: the middle first then both sides, from near to far. For example, as shown in FIG. 3, an adjoining rectangular area Rect is defined according to the slope of the current line segment L31. For example, if the length of the rectangular area is denoted as XNEI and the height of the rectangular area is denoted as YNEI, YNEI may be set as 10 pixels and XNEI may be set as 60 pixels. The slopes of up and down sides of the rectangular area Rect are the same as that of the current line segment L31. An endpoint of the current line segment L31 which is adjoined with the rectangular area is the middle point of one lateral side of the rectangular area. The connection line between this middle point and the middle point of the other lateral side of the rectangular area is the central line of the rectangular area. Within the rectangular area, the endpoint of another line segment is searched successively along the central line in accordance with a principle: the position on the central line first then the position on both sides of this position. If the value of the non-collinear degree between the current line segment and the line segment on which the searched endpoint of another line segment is located is less than a preset threshold, the another line segment is the adjacent line segment of the current line segment. Preferably, the non-collinear degree may be measured by a connection angle JOIN_ANG. The less the connection angle is, the lower the non-collinear degree is. Practically, other ways for measuring the non-collinear degree should be known by those skilled in the art. The connection angle LOIN_ANG should be calculated with the following formula (1):

$$\text{JOIN\_ANG} = \max(\text{abs}(a2-a1), \text{abs}(a2-a3)); \quad (1)$$

where a1 is an angle between the current line segment and a predetermined reference line (such as a horizontal line), a2 is an angle between a connection line of the current line segment with the another line segment and the predetermined reference line, and a3 is an angle between the another line segment and the predetermined reference line. According to the above formula, in FIG. 3, the value of the non-collinear degree between the current line segment L31 and the line segment L32 is less than the preset threshold, and thus the line segment L32 is the adjacent line segment of the current line segment L31.

The multiple found line segments are combined to obtain one or more segment combinations.

Figure 4:
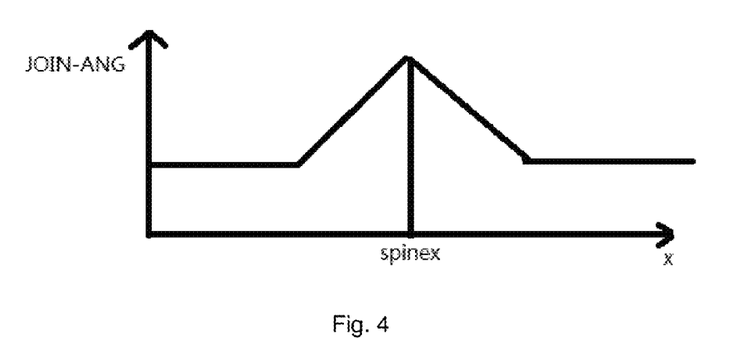
FIG. 4 is a schematic view illustratively showing distribution of the size of connection angles for a book-type text image.

Further, for the book-type text image, the distribution of the size of the connection angles is as shown in FIG. 4, where x denotes the coordinate in the horizontal direction and spinex is the book spine position. As can be seen from FIG. 4, the straight line at the central line of the book generally has larger distortion. The book spine (the central line) position is known in advance, thus the preset threshold of the connection angle near the central line may be set as greater value. Further, the connection angle JOIN_ANG near the central line may be calculated with the following formula (2):

$$\text{JOIN\_ANG} = \text{Max}(12, -280/w * \text{abs}(\text{end\_}x - \text{spine}x) + 40) \quad (2)$$

where w is the width of the image, end_x is the position of the endpoint of the line segment near the book spine, and spinex is the book spine position.

Further, for the file-type text image, it is unknown which area has larger distortion, and the line segments are combined by using a two-step method as follows. In a first step, a less preset threshold and a smaller rectangular area are set firstly to search the adjacent line segment, and the searched line segments are combined primarily to remove the noise. For example, YNEI is set as 10, XNEI is set as 60, and the connection angle JOIN_ANG is set as 8. In a second step, a greater preset threshold and a larger rectangular area are set to search the adjacent line segment, and the searched line segments are combined secondarily. For example, YNEI is set as 16, XNEI is set as 80, and the connection angle JOIN_ANG is set as 15.

Figure 5:
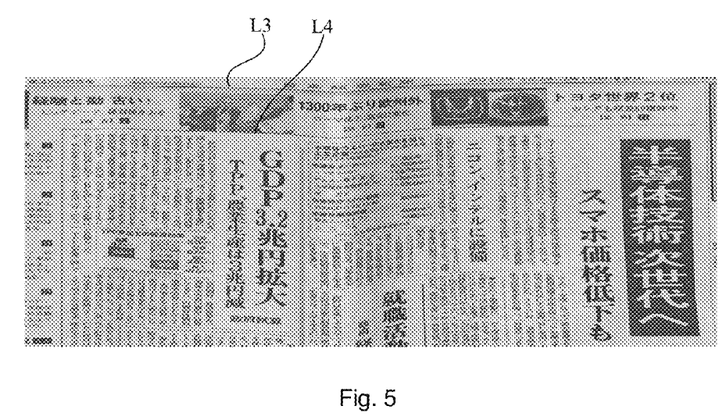
FIG. 5 is a schematic view illustratively showing a line segment at a boundary from a bright area to a dark area and a line segment at a boundary from a dark area to a bright area in a gray image.

Further, for the gray image, line segments at a boundary from a bright area to a dark area and line segments at a boundary from a dark area to a bright area are combined separately. For example, as shown in FIG. 5, the line segments L3 at the boundary from the bright area to the dark area and the line segments L3 at the boundary from the dark area to the bright area in the gray image are combined separately.

Turn back to step S203 in FIG. 2, the distorted straight line is the image is extracted according to the above line segment combination. For example, the distorted straight line in the image may be extracted by directly connecting multiple line segments which constituting the same line segment combination.

With the method for extracting the distorted straight line from the image according to the embodiment of the invention, the curved line of arbitrary shape can be extracted, and thus the accuracy for extracting the distorted straight line is improved.

According to an embodiment of the invention, the distorted straight line in the image is extracted by directly connecting multiple line segments, which is equivalent to approximating the curved line using multiple broken lines.

To extract the distorted straight line in the image more accurately, a method for extracting a distracted straight line from an image according to another embodiment of the invention is provided. Before the distorted straight line in the image is extracted, the method further includes performing a refinement process for optimizing size of a gradient and smoothness on the directly-connected line segment combination.

The refinement process may be performed by constructing and solving a balanced energy function for optimizing both of size of the gradient and smoothness. For example, the balanced energy function may be represented with the following formula (3):

$$\min_{\Delta y_1 \ldots \Delta y_n} \lambda_1 \sum_{i=1}^{n} \nabla I_y(y_i + \Delta y_i) + \\ \lambda_2 \sum_{i=1}^{n} |\Delta y_i| + \lambda_3 \sum_{i=1}^{n-1} |(y_i + \Delta y_i) - (y_{i+1} + \Delta y_{i+1})| + \\ \lambda_4 \sum_{i=1}^{n-1} |\nabla I_y(y_i + \Delta y_i) - \nabla I_y(y_{i+1} + \Delta y_{i+1})| \quad (3)$$

where ly(p) is the gradient of the pixel p in the y direction, which is calculated by using a template 0−T (that is, transpose of 0−); the parameter λ is set as: $\lambda_2=100$, $\lambda_3=1200$, $\lambda_4=4$, for the line at the boundary from the bright area to the dark area, $\lambda_1=-2.5$, and for the line at the boundary from the dark area to the bright area, $\lambda_1=2.5$; and yi takes an integer from −3 to 3. The first term of the energy function lets the gradient value greater, and the second term of the energy function lets the curved line smoother. For the third term, the absolute value is not an absolute value in a common sense, and is defined as follows: if abs(a−b)←1, |a−b|==0, or else |a−b|=abs(a−b). The above energy function constitutes a chain structure. The globally optimal solution of the energy function may be calculated by using the Viterbi algorithm. The curved line constituted by the globally optimal solutions has higher accuracy.

Practically, the refinement process may be performed only when a discontinuity larger than a predetermined number of pixels is present in the line segment combination. For example, the refinement process is performed when a discontinuity larger than 10 pixels is present in the line segment combination. In this case, the line segment in which the discontinuity is greater than 10 pixels is marked firstly. After the refinement process for optimizing the size of the gradient and the smoothness is performed on the directly-connected line segment combination, the connection line of the endpoints of the two refinement-processed line segments in which the discontinuity is greater than 10 pixels is extracted as the line segment at the discontinuity. Other line segments at the discontinuity smaller than 10 pixels are extracted according to the result of the refinement process.

Figure 6:
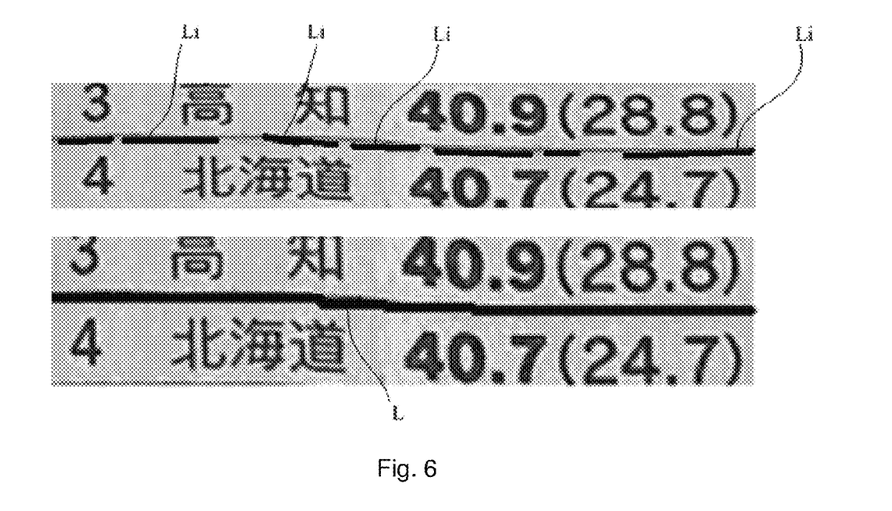
FIG. 6 is a schematic view illustratively showing an extracted distorted straight line after a refinement process according to an embodiment.

As shown in FIG. 6, as compared with the way for extracting the distorted straight line by directly connecting the combined line segments Li as shown in the upper portion of FIG. 6, the way for extracting the distorted straight line L after the refinement process as shown in the lower portion of FIG. 6 has increased accuracy.

The method for extracting the distorted straight line from the image according to the embodiment of the invention is applicable to the color image or the gray image, to extract the distorted horizontal straight line or vertical straight line from the color image or the gray image.

With the method for extracting the distorted straight line from the image according to the embodiment of the invention, the curved line of arbitrary shape can be extracted, and the method has higher accuracy.

Further, the method for extracting the distorted straight line from the image according to the embodiment of the invention has faster speed. For the image having the resolution of 3000 dpi and the size of 4000×3000 pixels, the time for running this method is about 500 ms.

The device 700 for extracting a distorted straight line from an image according to an embodiment of the invention will be described referring to FIG. 7.

Figure 7:
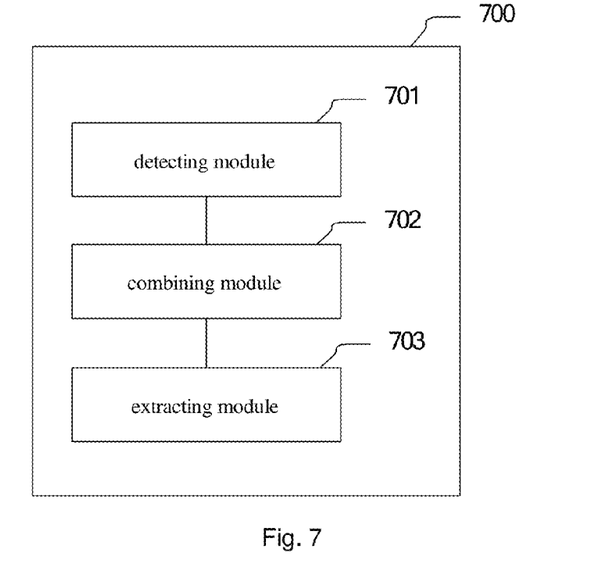
FIG. 7 is a block diagram illustratively showing a device for extracting a distorted straight line from an image according to an embodiment.

FIG. 7 is a block diagram illustratively showing a device 700 for extracting a distorted straight line from an image according to the embodiments. For conciseness, only portions closely related to the invention are shown. In the device 700 for extracting the distorted straight line from the image, the method for extracting the distorted straight line from the image described above referring to FIG. 2 can be performed. As shown in FIG. 7, the device 700 for extracting the distorted straight line from the image may include a detecting module 701, a combining module 702 and an extracting module 703.

The detecting module 701 may be configured to perform a line segment detection process on the image. The combining module 702 may be configured to, for each line segment detected, find adjacent line segments having a low non-collinear degree with a current line segment, so as to combine them together to obtain one or more line segment combinations. The extracting module 703 may be configured to extract the distorted straight line according to the line segment combination.

Specifically, the combining module 702 may be further configured to define an adjoining rectangular area along a slope direction of the current line segment; and search another line segment whose non-collinear degree with a current line segment is lower than a predetermined threshold as the adjacent line segment within the adjoining rectangular area in accordance with a principle: the middle first then both sides, from near to far, to combine the current line segment and the adjacent line segment, so as to obtain one or more line segment combination. The non-collinear degree may be measured by the connection angle. The less the connection angle is, the lower the non-collinear degree is.

For the book-type text image, the preset threshold for the position of the central line of the book in is greater. For the file-type text image, firstly, a less preset threshold and a smaller rectangular area are set firstly to combine the searched line segments primarily, and secondly, a greater preset threshold and a larger rectangular area are set to combine the searched line segments secondarily.

With the device for extracting the distorted straight line from the image according to the embodiment of the invention, the curved line of arbitrary shape can be extracted, and thus the extracted distorted straight line has higher accuracy.

A device for extracting a distorted straight line from an image according to another embodiment of the invention will be described below referring to FIG. 8.

Figure 8:
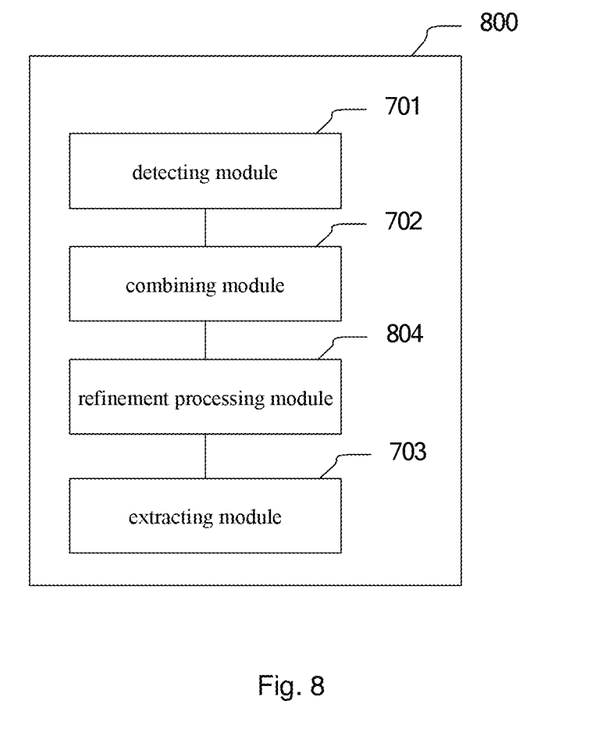
FIG. 8 is a block diagram illustratively showing a device for extracting a distorted straight line from an image according to another embodiment.

FIG. 8 is a block diagram illustratively showing a device 800 for extracting a distorted straight line from an image according to the embodiments. As shown in FIG. 8, in addition to the modules shown in FIG. 7, the device 800 for extracting the distorted straight line from the image according to the embodiments further includes a refinement processing module 804.

The refinement processing module 804 may be configured to perform a refinement process for optimizing size of a gradient and smoothness on the line segment combination before the extracting module 703 extracts the distorted straight line.

The refinement processing module 804 may be configured to perform the refinement process by constructing and solving a balanced energy function for optimizing both of size of the gradient and smoothness.

The refinement processing module 804 may also be configured to perform the refinement process only when a discontinuity larger than a predetermined number of pixels is present in the line segment combination. For two line segments whose discontinuity is larger than a predetermined pixel value, a connection line of ends of two line segments subjected to the refinement process is extracted as a line segment at the discontinuity.

The device for extracting the distorted straight line from the image according to the embodiment of the invention is applicable to the color image or the gray image, to extract the distorted horizontal straight line or vertical straight line from the color image or the gray image.

With the device for extracting the distorted straight line from the image according to the embodiment of the invention, the curved line of arbitrary shape can be extracted, and thus the accuracy for extracting distorted straight line is improved.

Further, the method for extracting the distorted straight line from the image according to the embodiment of the invention has faster speed. For the image having the resolution of 3000 dpi and the size of 4000×3000 pixels, the time for running this method is about 500 ms.

The foregoing combined with the embodiments describes the basic principle of the present invention. However, it should be noted that: those ordinarily skilled in the art would appreciate that all or any step or component of the method and the apparatus may be realized, in the form of hardware, firmware, software or combinations thereof, in any calculation means (including a processor, a storage medium, etc.) or a network of calculation means. This can be realized by those ordinarily skilled in the art by applying their basic programming skills after reviewing the descriptions.

Therefore, the object may also be achieved by running a program or a set of programs on any calculation means. The calculation means may be well-known versatile means. Therefore, the object may also be achieved by only providing a program product containing a program code for carrying out a method or means. That is, such a program product also constitutes the present invention, and a storage medium storing such a program product also constitutes the present invention. Obviously, the storage medium may be any well-known storage medium or any storage medium that would be developed in the future.

Figure 9:
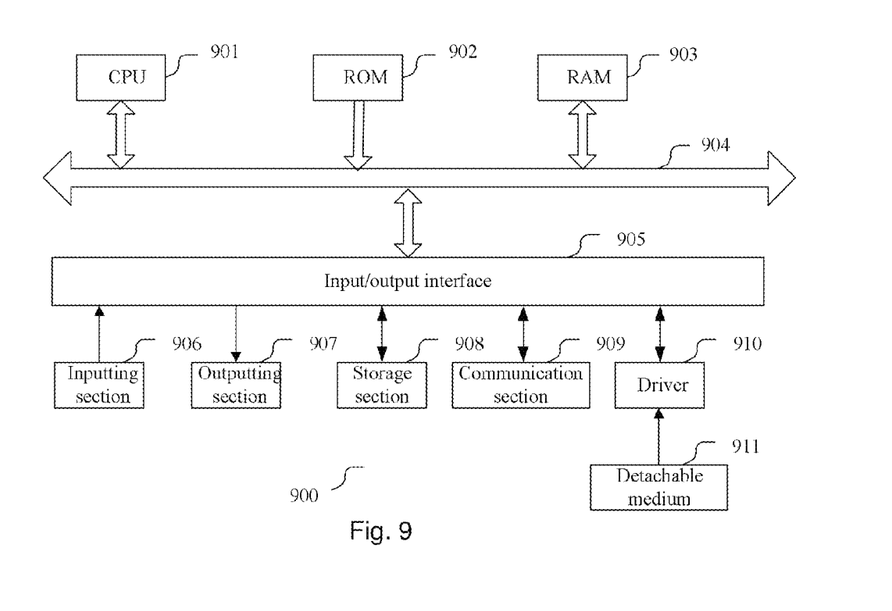
FIG. 9 is an exemplary structural view of a computing device that can be used for carrying out a method and a device for extracting a distorted straight line from an image according to an embodiment.

In carrying out the embodiments by means of software and/or firmware, a program constituting the software is installed from the storage medium or network to a computer having a dedicated hardware structure, e.g. the versatile computer 900 as shown in FIG. 9, and the computer can perform various functions and so on when it is installed with various programs.

In FIG. 9, a central processing unit (CPU) 901 performs various processing according to a program stored in a Read Only Memory (ROM) 902 or a program loaded from a storage section 908 to a Random Access Memory (RAM) 903. In the RAM 903, data needed in performing various processing by the CPU 901 and so on is also stored according to requirements. The CPU 901, the ROM 902 and the RAM 903 are linked to each other via a bus 904. An input/output interface 905 is also linked to the bus 904.

The following components are linked to the input/output interface 905: an inputting section 906 (including a keyboard, a mouse, etc.), an outputting section 907 (including a display, such as a Cathode-Ray Tube (CRT), a Liquid Crystal Display (LCD) and so on, a loudspeaker, etc.), a storage section 908 (including a hard disk, etc.), and a communication section 909 (including a network interface card such as an LAN card, a modem and so on). The communication section 909 performs communication process via network such as Internet. A driver 910 may also be linked to the input/output interface 905 as needed. A detachable medium 911 such as a magnetic disk, an optical disk, a magneto optical disk, a semiconductor memory and so on is installed on a driver 910 according to requirements, such that a computer program read therefrom is installed into the storage section 908 according to requirements.

In carrying out the above series of processing by means of software, a program constituting software is installed from a network such as Internet or a storage medium such as the detachable medium 911.

As would be understood by those skilled in the art, this storage medium is not limited to the detachable medium 911 as shown in FIG. 9 which stores therein with a program and which is distributed separately from devices to provide a program for a user. Examples of the detachable medium 911 include a magnetic disk (including a floppy disk (registered trademark)), an optical disk (including a Compact Disk Read-Only Memory (CD-ROM) and a Digital Versatile Disk (DVD), a magneto optical disk (including a minidisk (MD) (a registered trademark)) and a semiconductor memory. Or, the storage medium may be the ROM 902, a hard disk included in the storage section 908, etc., which store a program, and which are distributed together with a device including them to the user.

The embodiments further propose a program product storing a machine-readable instruction code. When the instruction code is read and executed by a machine, the above method according to the embodiments can be carried out.

Correspondingly, a storage medium for carrying the program product storing a machine-readable instruction code is also included by the disclosure. The storage medium includes but is not limited to a floppy disk, an optical disk, a magneto optical disk, a memory card, a memory stick, etc.

Further, some methods and devices applied to a combined tool according to the embodiment of the invention can extend the application range of the combination.

As would be readily understood by those ordinarily skilled in the art, the examples listed herein are only exemplary, and the present invention is not limited thereto.

As an example, the respective steps of the above method and the respective constituent modules and/or units of the above device may be embodied as software, firmware, hardware or combinations thereof, and serve as a part of a corresponding device. Specific means or manners that can be used for configuring the respective constituent modules and units in the above apparatus in the form of software, firmware, hardware or combinations thereof are well-known to those skilled in the art, which will not be repeatedly described herein.

As an example, in carrying out the embodiments by means of software and/or firmware, a program constituting the software is installed from the storage medium or network to a computer having a dedicated hardware structure, e.g. the versatile computer 900 as shown in FIG. 9, and the computer can perform various functions and so on when it is installed with various programs.

In the foregoing descriptions of the detailed embodiments, features described and/or shown for one embodiment may be used in one or more other embodiments in an identical or similar manner, be combined with features in other embodiments, or substitute for features in other embodiments.

It should be emphasized that when used in this text the term "comprise/include" refers to existence of features, elements, steps of assemblies, without excluding existence or addition of one or more other features, elements, steps or assemblies.

In the Description, expressions such "first", "second" and "Nth" are used for distinguishing the described features in terms of wording, so as to clearly describe the present invention. Therefore, these expressions shall not be regarded as being limitative at all.

In addition, the method is not limited to be carried out in the temporal order described in the Description, but may also be carried out in parallel or separately in other temporal orders. Therefore, the order of carrying out the method described in the Description fails to constitute a limitation to the technical scope.

The present invention has been disclosed above by using the embodiments. However, it should be understood that various changes, substitutions or transformations may be carried out by those skilled in the art without departing from the spirit and the scope of the present invention defined by the attached claims. These changes, substitutions or transformations should also be considered as falling within the scope of protection of the invention.

From the above descriptions, it can be seen that the disclosure at least discloses the following technical solutions:

Technical Solution 1.

A method for extracting a distorted straight line from an image, comprising the following steps:
   performing a line segment detection process on the image;
   for each line segment detected, finding adjacent line segments having a low non-collinear degree with a current line segment, so as to combine them together to obtain one or more line segment combinations; and
   extracting the distorted straight line according to the line segment combination.

Technical Solution 2.

The method of technical solution 1, before the extracting, the following step is further included: a refinement process for optimizing size of a gradient and smoothness is performed on the line segment combination.

Technical Solution 3.

The method of technical solution 2, wherein the refinement process is performed by constructing and solving a balanced energy function for optimizing both of size of the gradient and smoothness.

Technical Solution 4.

The method of technical solution 2 or 3, wherein the refinement process is performed when a discontinuity larger than a predetermined number of pixels is present in the line segment combination.

Technical Solution 5.

The method of technical solution 1, wherein finding adjacent line segments having a low non-collinear degree with a current line segment further comprises:
   defining an adjoining rectangular area along a slope direction of the current line segment; and
   searching another line segment whose non-collinear degree with a current line segment is lower than a predetermined threshold as the adjacent line segment within the adjoining rectangular area in accordance with a principle: the middle first then both sides, from near to far.

Technical Solution 6.

The method of technical solution 5, wherein the non-collinear degree is measured by calculating a connection angle with the following formula, the less the connection angle, the lower the non-collinear degree:

$$\text{connection angle} = \max(\text{abs}(a2-a1), \text{abs}(a2-a3));$$

wherein a1 is an angle between the current line segment and a predetermined reference line, a2 is an angle between a connection line of the current line segment with the another line segment and the predetermined reference line, and a3 is an angle between the another line segment and the predetermined reference line.

Technical Solution 7.

The method of technical solution 1, wherein before the combining, the method further comprises filtering out the detected line segments with shorter length.

Technical Solution 8.

The method of technical solution 1, wherein the process of performing the line segment detection process further comprises: clustering pixels with similar gradient directions and magnitudes.

Technical Solution 9.

The method of technical solution 5, wherein for the book-type text image, the preset threshold for the position of the central line of a book is greater.

Technical Solution 10.

The method of technical solution 5, wherein for a text image of a document type, first setting the predetermined threshold which is smaller and the rectangular area which is smaller to perform an initial combination on found line segments, and then setting the predetermined threshold which is bigger and the rectangular area which is bigger to perform a secondary combination on found line segments.

Technical Solution 11.

The method of technical solution 4, wherein for two line segments whose discontinuity is larger than a predetermined pixel value, a connection line of ends of two line segments subjected to said refinement process is extracted as a line segment at said discontinuity.

Technical Solution 12.

The method of technical solution 1 or 2, wherein if the image is a gray image, line segments at a boundary from a bright area to a dark area and line segments at a boundary from a dark area to a bright area are combined separately.

Technical Solution 13.

The method of technical solution 1, wherein before the line segment detection process is performed on the image, a preprocess is performed on the image, the preprocess is one or more of:
- zooming out the image;
- converting the image into a gray image if the image is a color image; and
- smoothing the image.

Technical Solution 14.

A device for extracting a distorted straight line from an image, comprising:
- a detecting module configured to perform a line segment detection process on said image;
- a combining module configured to, for each line segment detected, find adjacent line segments having a low non-collinear degree with a current line segment, so as to combine them together to obtain one or more line segment combinations; and
- an extracting module configured to extract said distorted straight line according to said line segment combination.

Technical Solution 15.

The device of technical solution 14, further comprising:
- a refinement processing module configured to perform a refinement process for optimizing size of a gradient and smoothness to said line segment combination before said extracting module extracts said distorted straight line.

What is claimed is:

1. A method for extracting a distorted straight line from an image, comprising:
   performing a line segment detection process on the image;
   for each line segment detected, finding adjacent line segments having a low non-collinear degree with a current line segment, so as to combine them together to obtain one or more line segment combinations; and
   extracting the distorted straight line according to the line segment combination,
   wherein finding adjacent line segments having a low non-collinear degree with a current line segment further comprises:
   defining an adjoining rectangular area along a slope direction of the current line segment; and
   searching another line segment whose non-collinear degree with a current line segment is lower than a predetermined threshold as the adjacent line segment within the adjoining rectangular area in accordance with a principle:
   the middle first, then both sides; and
   from near to far,
   wherein the non-collinear degree is measured by calculating a connection angle with the following formula, the less the connection angle, the lower the non-collinear degree:

$$\text{connection angle} = \max(\text{abs}(a2-a1), \text{abs}(a2-a3));$$
   wherein a1 is an angle between the current line segment and a predetermined reference line;
   a2 is an angle between a connection line of the current line segment with the another line segment and the predetermined reference line; and
   a3 is an angle between the another line segment and the predetermined reference line.

2. The method according to claim 1, wherein before extracting:
   a refinement process for optimizing size of a gradient and smoothness is performed on the line segment combination.

3. The method according to claim 2, wherein the refinement process is performed by constructing and solving a balanced energy function for optimizing both of size of the gradient and smoothness.

4. The method according to claim 2, wherein the refinement process is performed when a discontinuity larger than a predetermined number of pixels is present in the line segment combination.

5. The method according to claim 3, wherein the refinement process is performed when a discontinuity larger than a predetermined number of pixels is present in the line segment combination.

6. The method according to claim 1, wherein for a text image of a document type, first setting the predetermined threshold, which is smaller, and the rectangular area, which is smaller, to perform an initial combination on the found line segments, and then setting the predetermined threshold, which is bigger, and the rectangular area, which is bigger, to perform a secondary combination on the found line segments.

7. The method according to claim 4, wherein for two line segments, whose discontinuity is larger than a predetermined pixel value, a connection line of ends of two line segments, subjected to the refinement process, are extracted as a line segment at the discontinuity.

8. The method according to claim 5, wherein for two line segments, whose discontinuity is larger than a predetermined pixel value, a connection line of ends of two line segments, subjected to the refinement process, are extracted as a line segment at the discontinuity.

9. A device for extracting a distorted straight line from an image, comprising:
   a detecting module configured to perform a line segment detection process on the image;
   a combining module configured to, for each line segment detected, find adjacent line segments having a low non-collinear degree with a current line segment, so as to combine them together to obtain one or more line segment combinations; and
   an extracting module configured to extract the distorted straight line according to the line segment combination,
   wherein finding adjacent line segments having a low non-collinear degree with a current line segment further comprises:
   defining an adjoining rectangular area along a slope direction of the current line segment; and searching another line segment whose non-collinear degree with a current line segment is lower than a predetermined threshold as the adjacent line segment within the adjoining rectangular area in accordance with a principle:
the middle first, then both sides; and
from near to far,
wherein the non-collinear degree is measured by calculating a connection angle with the following formula, the less the connection angle, the lower the non-collinear degree:

connection angle=max(abs($a2-a1$),abs($a2-a3$));
    wherein $a1$ is an angle between the current line segment and a predetermined reference line;
$a2$ is an angle between a connection line of the current line segment with the another line segment and the predetermined reference line; and
$a3$ is an angle between the another line segment and the predetermined reference line.

10. The device according to claim 9, further comprising:
a refinement processing module configured to perform a refinement process for optimizing size of a gradient and smoothness on the line segment combination before the extracting module extracts the distorted straight line.

* * * * *